Patented Apr. 24, 1928.

1,667,447

UNITED STATES PATENT OFFICE.

HYLTON SWAN, OF UPPER MONTCLAIR, NEW JERSEY, ASSIGNOR TO BAKELITE CORPORATION, OF NEW YORK, N. Y., A CORPORATION OF DELAWARE.

METHOD OF MAKING IMPRESSIONS.

No Drawing.     Application filed September 28, 1925. Serial No. 59,209.

This invention relates to molds or negatives of a kind used in the printing art, and to a process for manufacturing the same. Beginning with a positive of any desired sort, such as an electrotype, photo-engraving, type set-up, etching, half-tone, etc., it is frequently desired to make a mold or negative from which printing plates or other positives may be reproduced. Such molds or negative impressions are frequently made by pressing sheet lead or other alloy against the positive. This method has the disadvantage of requiring heavy pressures which are frequently injurious to the positive and in the case of a type set-up are sometimes sufficient to crush or seriously damage the type. The necessary pressure upon the lead may be as great as seven tons or more per square inch, and in addition to the injurious effect upon the positive requires large and expensive presses. According to my invention I form the mold or negative impression by the use of a plastic composition having a metal or metallized surface. I am thus enabled to obtain a clear and sharp negative impression while using much lower pressures, sometimes as low as two or three thousand pounds per square inch or even less. These pressures do not injure the positive and may be applied by less expensive equipment. Moreover such plastic compositions may assume any desired shape, the resulting printing plates being either flat or curved, according to the type of press for which they are intended. At present I prefer to employ a hardenable or transformable plastic composition, for instance, a heat induratable resin composition, such as a potentially reactive phenol resin composition, surfaced or coated with sprayed metal, athough my invention is not limited thereto.

A preferred procedure is as follows: I impregnate one or more layers of bibulous paper with a potentially reactive phenol resin composition, and after drying this material I coat one surface thereof with sprayed metal, preferably lead, by means of a Schoop gun or otherwise. I then position this reactive metal-coated composition with its metallized surface in contact with the positive and subject the whole to heat and pressure, which may be applied by an ordinary steam-heated hydraulic press. The metallized composition receives the impression of the positive and at the same time is transformed to a hardened and durable state by virtue of the heat and pressure which it undergoes. At the time of the transformation the composition may also be given any desired shape, such as that of a portion of a cylindrical surface. Such molding or shaping of plastic compositions under heat and pressure is of course well understood by those familiar with this art. The resulting product is a negative impression or mold composed of a durable, molded, phenol resin composition, and having a surface of lead firmly united to the said resin composition. This mold or negative impression may then be used in the same manner as an ordinary lead mold or an electrotype negative for the reproduction of positives. These positives may be molded from phenol resin compositions, from wax, or from any other suitable material and may be used as printing plates.

I prefer to spray the metal onto the plastic because of the rapidity and cheapness of the operation, and because of the improved adherence obtained between the resulting sprayed metal surface layer and the plastic composition backing. I may use any sprayable metal or alloy, such for instance as lead, aluminum, copper, iron, zinc, tin, etc. or alloys of the same, and may employ any other suitable sprayable substances, surfaces covered with such substances by means of a spraying operation being herein designated as metallized surfaces.

As the plastic composition, I may employ a stereotype mat such as those now used in the printing art, or any other material which will give the desired backing for the metal surface. I prefer however to use a transformable or potentially reactive plastic composition such as is represented by phenol resin compositions and condensation products of polyatomic alcohols with polybasic acids. In the case of phenol resin compositions I prefer those comprising a mixture of a phenolic condensation product and a fibrous material. The fibrous material may assume the form of paper or fabric, either in single sheets or in laminated stock, or it may be in the form of wood flour or other filler. I do not, however, wish to be limited to fibrous fillers, as I may use a great variety of substances, including metal or other powders, with advantage under certain conditions.

I claim:

1. In a method of making a transformable plastic material adapted for receiving a negative impression from a positive, the step which comprises spraying a surface layer of metal onto a potentially reactive, heat induratable, resin composition.

2. Method of making a negative impression from a positive which comprises forming a sheet of potentially reactive, heat induratable, resin composition, spraying thereon a surface layer of metal, pressing said reactive sheet against said positive with said metallized surface in contact therewith, and simultaneously transforming said reactive sheet under heat and pressure whereby it receives and retains a permanent impression of said positive in its metallized surface and an integral union between said metallized surface and said transformed sheet is produced.

3. A composite body adapted for use in receiving a negative impression from a positive, comprising a potentially reactive, heat induratable, resin composition backing having a firmly united sprayed metal surface thereon.

4. A matrix blank comprising a backing sheet of potentially reactive, heat induratable, resin composition having a firmly united sprayed metal surface thereon.

In testimony whereof, I affix my signature.

HYLTON SWAN.